(No Model.)

T. B. CLATWORTHY.
PIPE COUPLING.

No. 269,011. Patented Dec. 12, 1882.

Witnesses:
Fred Hayne
John Becker

Inventor:
T. B. Clatworthy
by his Attorneys
Brown & Brown

UNITED STATES PATENT OFFICE.

THOMAS B. CLATWORTHY, OF NEW YORK, N. Y., ASSIGNOR TO ABENDROTH & ROOT MANUFACTURING COMPANY, OF SAME PLACE.

PIPE-COUPLING.

SPECIFICATION forming part of Letters Patent No. 269,011, dated December 12, 1882.

Application filed November 3, 1882. (No model.)

*To all whom it may concern:*

Be it known that I, THOMAS B. CLATWORTHY, of the city of New York, in the county and State of New York, have invented a new and useful Improvement in Pipe-Couplings, of which the following is a specification.

My invention is more especially designed for use with sheet-iron pipe for hydraulic purposes, in which the joints are calked with lead or other packing material; and it relates to couplings which are composed of inner and outer rings and a connecting-flange between the ends of the rings, whereby are formed two annular sockets, in which the ends of the pipe are secured by calking. These couplings have been made entirely of cast-iron. Such cast-iron couplings are, however, objectionable, because in order to give the inner ring the strength desired to resist blows in calking it must be so thick and heavy that it will materially reduce the caliber of the pipe.

The object of my invention is to remedy this and other defects; and to these ends the invention consists in a coupling composed of an inner ring of wrought-iron and an outer ring of cast-iron, having an internal flange, which is secured by casting upon the inner ring, thereby forming two annular sockets for the reception of the pipe. The outer ring is preferably coned or tapered in reverse directions internally, so as to form dovetailed or undercut sockets.

Figure 1:
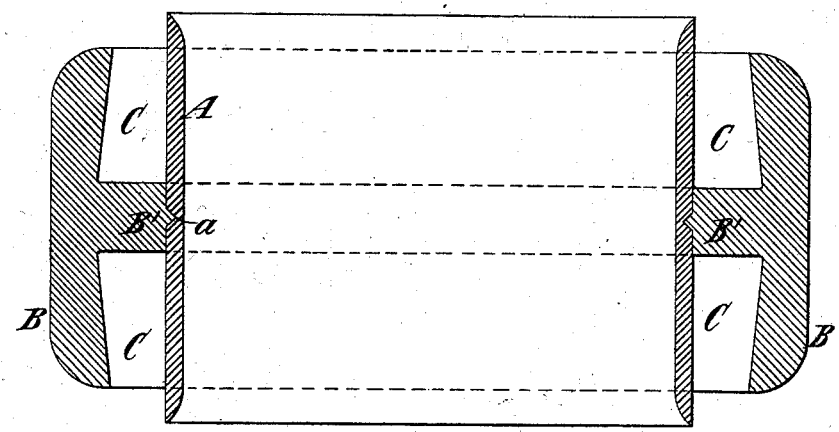
Figure 2:
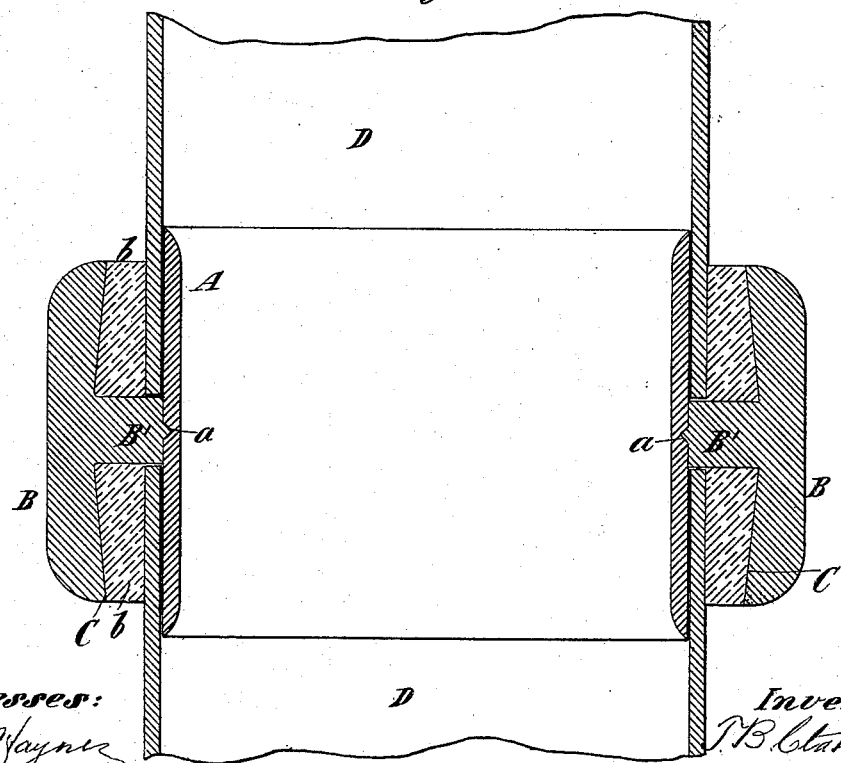

In the accompanying drawings, Figure 1 represents a central section of my improved coupling alone; and Fig. 2 represents a similar section of the coupling, showing the pipes secured therein.

Similar letters of reference designate corresponding parts in both figures.

A B designate respectively the inner and outer rings of the coupling; and B' designates the internal flange which unites said rings between their ends, thereby forming two annular sockets, C. The inner ring, A, is made of wrought-iron, and may consist of a piece of ordinary tubing, or made of sheet-iron, and riveted or otherwise formed. The two rings are secured together by placing the inner ring in a suitable mold and casting the outer ring about it. The flange B' will in cooling contract tightly upon the inner ring, and, if desired, the exterior of the inner ring may be grooved or roughened, as at a, to make its union with the flange more secure.

The sockets C are undercut or dovetailed, being largest at the bottom, and the inner ring is longer than the outer one, so that it projects beyond the same at each end.

In connecting the pipes D their ends are inserted in the sockets C, and the lead or other material b calked in. The prolongation of the inner ring is very desirable, as it supports the pipe beyond the point of calking and prevents the pipe being perforated or injured by an accidental blow of the calking-tool. The sockets C being dovetailed or undercut, the calking material cannot get loose and get out. The inner ring, being of wrought-iron, may be so thin that it will not materially reduce the caliber of the pipe, and still will afford the pipe adequate support.

What I claim as my invention, and desire to secure by Letters Patent, is—

1. The pipe-coupling composed of an inner ring of wrought-iron and an outer ring of cast-iron, having an internal flange, which is secured by casting upon the inner ring, thereby forming two annular sockets for the reception of the pipe, substantially as described.

2. The pipe-coupling composed of an inner ring of wrought-iron and an outer ring of cast-iron, coned or tapered internally and having an internal flange, which is secured by casting upon the inner ring, thereby forming two annular dovetailed sockets for the reception of the pipe, substantially as described.

T. B. CLATWORTHY.

Witnesses:
FREDK. HAYNES,
E. L. MORAN.